United States Patent [19]

Vance

[11] Patent Number: 4,522,421
[45] Date of Patent: Jun. 11, 1985

[54] INTERCHANGEABLE TRAILER BALL ASSEMBLY

[76] Inventor: Thomas L. Vance, 2939 Second Ave. North, Hudson, Fla. 33567

[21] Appl. No.: 486,679

[22] Filed: Apr. 20, 1983

[51] Int. Cl.$^3$ .............................................. B60D 1/06
[52] U.S. Cl. ............................... 280/511; 280/415 A; 403/131
[58] Field of Search .......... 280/511, 504, 515, 415 A; 403/131, 328, DIG. 6

[56] References Cited

U.S. PATENT DOCUMENTS

| | | | |
|---|---|---|---|
| 2,189,710 | 2/1940 | Draeger | 280/511 |
| 2,297,182 | 9/1942 | Weiss | 280/511 |
| 2,438,749 | 3/1948 | Harrer | 280/511 |
| 3,630,546 | 12/1971 | Church | 280/511 |
| 4,201,400 | 5/1980 | Hoogenbosch | 280/511 |
| 4,433,854 | 2/1984 | Smith | 280/511 |

FOREIGN PATENT DOCUMENTS 644159 10/1950 United Kingdom .

*Primary Examiner*—Joseph F. Peters, Jr.
*Assistant Examiner*—Charles R. Watts
*Attorney, Agent, or Firm*—Charles C. Garvey, Jr.

[57] ABSTRACT

An interchangeable trailer ball apparatus provides an elongated hollowed pin which is attached normally to the bumper or drawbar of a vehicle. The bumper provides an internal elongated longitudinal bore with a lateral bore intersecting the longitudinal bore at one end portion. Disposed within the lateral bore is a locking element which is moveably mounted between retracted and projected positions. Disposed slideably within the longitudinal bore of the bumper pin is an actuating rod which is moveably mounted between positions which alternatively allow the locking element to assume an inward retracted position and abut the locking element to move it into the projected position. A trailer ball having a closed end bore is removably attachable to the bumper pin when the locking element is in the retracted position and is secured to the bumper pin by the locking element when it assumes the projected position. The trailer ball can have an annular recess for receiving thereinto the locking element.

10 Claims, 4 Drawing Figures 4,522,421

INTERCHANGEABLE TRAILER BALL ASSEMBLY

BACKGROUND OF THE INVENTION

1. Field of the Invention

The present invention relates to towing devices and more particularly relates to a towing apparatus providing interchangeable trailer balls which are removed by means of a concealed actuating pin recessed within the assembly so as to prevent inadvertent disassembly and shield working parts from weather. Even more particularly, the present invention relates to an improved interchangeable trailer ball apparatus in which a concealed, shielded release mechanism remains attached to the vehicle bumper and interchangeable integral trailer balls interchange therewith, shielding and covering the release mechanism upon assembly.

2. General Background

A common device for towing trailers uses a ball which is mounted on the bumper or draw works of a vehicle. The trailer ball forms a ball and socket coupling with a trailer. Typically, the socket portion is on the trailer tongue. Normally the trailer provides some sort of adjustable coupling as part of the tongue which allows the socket to slip over the ball and thereafter the coupling is closed or secured so that the socket cannot be removed from the ball. An articulating ball and socket coupling then allows movement of the trailer with respect to the vehicle as typically occurs during towing.

The size of these ball and socket connections are usually standardized and measured or specified in terms of trailer ball diameter. Unfortunately, trailer ball diameters are not always the same size for a given trailer. For example, there can be a plurality of different diameters which an individual might be required to use for towing various trailers. Typical diameters of trailer balls are, for example: 1⅞ inches, 2 inches, 2¼ inches, and 2 5/16 inches.

Often times a user may leave a trailer ball on his bumper for a long period of time and forget the particular size and possibly be inconvenienced or stranded when a trailer needs to be towed which is of a size that doesn't fit the particular trailer ball. One solution which is inefficient, time consuming, and bothersome if implemented is to keep a large wrench in the trunk or other storage compartment of the vehicle to manually interchange a plurality of trailer balls of varying sizes. This process often requires the user to dirty his hands and/or clothes with rust, dirt, grease, and the like in order to change the ball. This problem is complicated of course in poor weather conditions such as snow or rain. Often times the trailer ball assembly cannot be removed with a wrench because the thread and nut connection has become rusted and/or corroded and cannot be disassembled with ordinary manual force. It is to this general problem that the present invention is addressed.

Several trailer "hitch" connections have been patented. Some of these devices purport to provide interchangeable balls of varying diameter.

For example, the Hoogenbosch U.S. Pat. No. 4,201,400 issued on May 6, 1980 provides a towing device comprising a towball and latching means releaseably operable to, in use, secure the towball to the drawbar of a vehicle. An upper actuating button penetrates the upper surface of the ball. The entire actuating mechanism must be provided with each and every interchangeable ball. The upper actuating button is undesirable because water from rain can enter the mechanism.

In U.S. Pat. No. 2,297,182 issued to D. S. Weiss on Sept. 29, 1942 entitled "Trailer Coupling" there is provided a ball-and-socket coupling with permanently engaged ball and socket elements and a protected and easily lubricated wearing surface. Also provided is means to compensate wear in the various parts.

In U.S. Pat. No. 2,189,710 entitled "Hitching Device for Trailers", issued on Feb. 6, 1940 to L. H. Draeger there is provided a hitch element on which a ball of novel form is positioned for cooperation with a two part socket carried by another hitch element; the socket being so designed and arranged as to include one main integral section which encloses more than a half of the spherical ball structure so that the stresses and stains are primarily on the sold mass, and a locking portion of the socket which functions for retaining the ball in its seat in the main section. Other features include the elongated shape of the socket seat for the ball permitting its disengagement after loosening of the locking element, the structure of the socket locking element, the adjusting bolt, and the locking means for the latter.

In U.S. Pat. No. 2,438,749 issued on Mar. 30, 1948 to Paul Harrer entitled "Hitch", there is provided a trailer hitch comprising a socket member provided with peripheral lugs and adapted to receive a ball element and a retainer member formed for cooperation with the lugs and with the ball element for retaining the element within the socket member when said members are interlocked upon partial rotation of one relative to the other.

In British Pat. No. 644,159 issued to Henry Billington, there is seen couplings for trailer vehicles of the kind in which the drawbar of the trailer vehicle has secured thereto a ball member and a socket member which are permanently in engagement; the ball member being provided with a shank having a tapered portion, the lower end of the shank being adapted to be engaged by a member carried by the drawbar of the tractor vehicle whereby the tapered portion of the shank can be drawn into a tapered hole in the tractor drawbar.

In the Church patent (U.S. Pat. No. 3,630,546), there is provided a compound male coupling member for a ball-and-socket-type hitch, and wherein the member is composed of selectively exchangeable components co-acting to form hitch balls each having a different diameter. The hitch ball is formed of a pair of identical semi-spherical members as shown in FIG. 2 of the drawings. The upper end of the bolt is adapted to be encased in the two semispherical members. The assembled structure is held together by a conventional nut which is releaseably threaded onto threads.

3. General Discussion of the Present Invention

The present invention solves these prior art problems and shortcomings by providing an interchangeable trailer ball assembly which uses an elongated bumper pin having an internal longitudinal bore with at least one lateral bore extending from the longitudinal bore at generally right angles thereto. The lateral bore both intersects the longitudinal bore and is exposed at the surface of the bumper pin. The bumper pin can be attached to the bumper or draw works of a vehicle by means of for example a thread and nut connection. An annular shoulder on the bumper pin completes the assembly of the bumper pin to the draw works or bumper. At least one locking element is movably mounted within the bumper pin in each lateral bore between retracted and projected positions. Disposed slideably in the longitudinal bore is an actuating rod which is moved in a slideable fashion between extreme positions which cooperate with the locking element to produce the aforementioned retracted and projected positions of the locking elements. Interchangeable trailer balls are attachable to the bumper pin one at a time as selected. Each trailer ball is integral and provides a closed end bore receptive of the bumper pin. A recess communicating with the closed end bore of the trailer ball can be provided for forming a connection with the locking element to secure the trailer ball upon the bumper pin.

In the preferred embodiment, the exterior surface of each trailer ball is integral and uninterrupted to prevent the entry of rain and/or dirt which might damage working parts. A feature of the present invention is that the mechanism for releasing the trailer ball is contained entirely within the bumper pin which remains permanently on the bumper of the vehicle so that a one piece integral trailer ball can be cheaply and inexpensively manufactured to fit upon the bumper pin. This produces a dependable trailer ball apparatus which is simple to use, easy to maintain, and inexpensive to manufacture.

Another feature of the present invention is that the actuating rod is entirely disposed internally of the assembly so that it cannot be inadvertently actuated or tripped. Thus, the present invention provides an interchangeable trailer ball apparatus which is safe. In the preferred embodiment, movement of the actuating rod is effected by using a tool such as an elongated shaft such as a large nail for example to move the actuating pin. This provides a tamper resistant and child-proof assembly which discourages inadvertent or undesired release of the ball from the bumper pin.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein.

DETAILED DESCRIPTION OF THE PREFERRED EMBODIMENT

FIGS. 1 through 4 best show the preferred embodiment of the apparatus of the present invention designated generally by the numeral 10.

Figure 1:
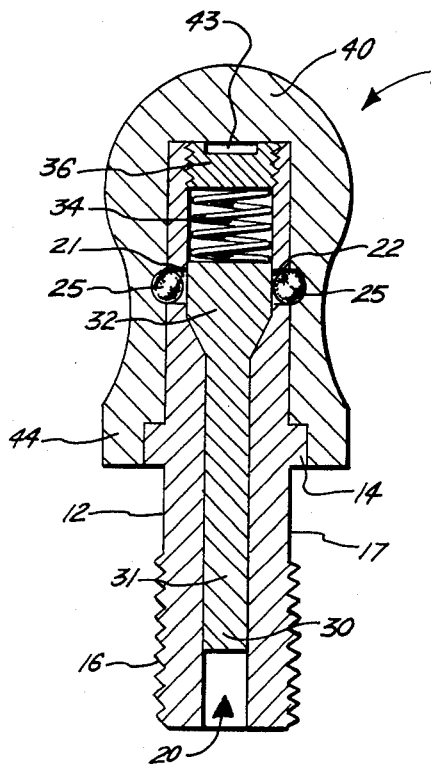
FIG. 1 is a sectional view of the preferred embodiment of the apparatus of the present invention with the locking position being shown.
Figure 2:
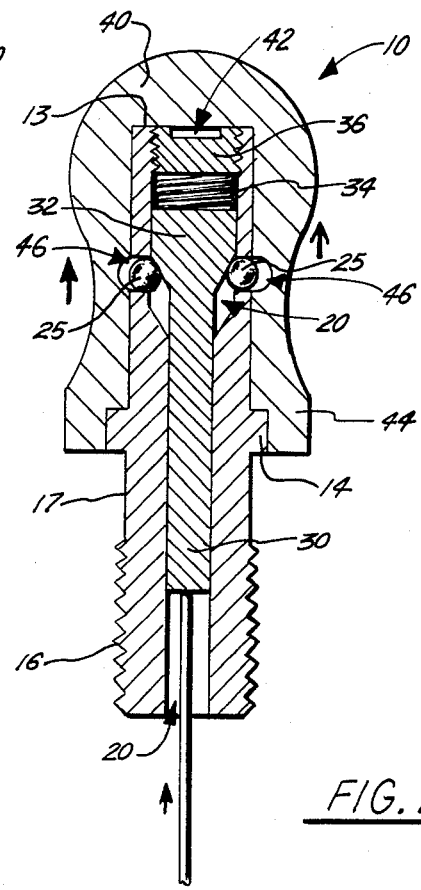
FIG. 2 is a sectional view of the preferred embodiment of the apparatus of the present invention with the released position being shown.
Figure 3:
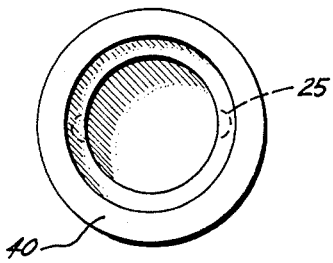
FIG. 3 is a sectional view taken along lines 3—3 of FIG. 2.
Figure 4:
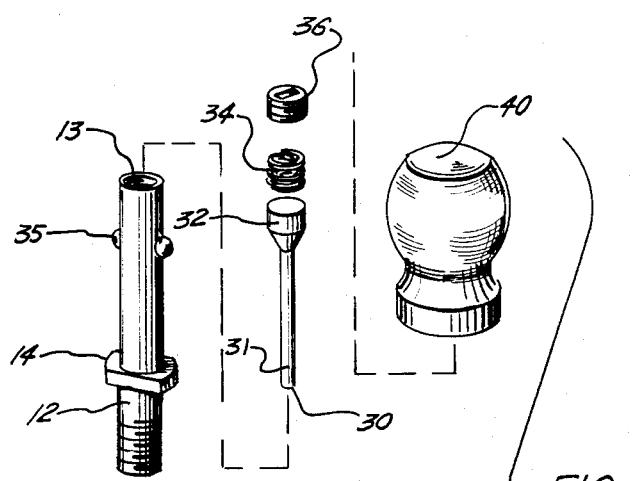
FIG. 4 is an exploded sectional view of the preferred embodiment of the apparatus of the present invention showing the bumper pin with the trailer ball having been released therefrom.
Figure 4:
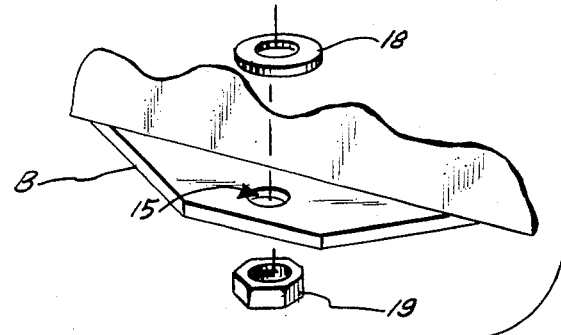

In FIG. 1 there can be seen removable interchangeable trailer ball assembly 10 having a bumper pin 12 which is flanged having an annular flange 14 which normally abuts the top surface of a bumper B at opening 15. Bumper pin 12 provides lower threaded portion 16 and unthreaded smooth section 17. Washer 18 and nut 19 cooperate with threaded section 16 to complete an assembly of bumper pin 12 to vehicle bumper B. Opening 15 would be of a diameter slightly larger than pin 13 at threads 16, but smaller than the diameter of flange 14.

Bumper pin 12 provides an internal bore 20 and preferably a pair of lateral bores 21, 22 which intersect bore 20 at right angles thereto. Disposed respectively in each lateral bore 21, 22 are locking elements 25 which are preferably solid steel and spherical. Disposed in a slideable fashion within bore 20 is actuating rod 30. Note that actuating rod 30 provides a narrowed constant diameter section 31 and an enlarged diameter section 32 at one end portion. Spring 34 normally biases actuating rod 30 to a position which places enlarged diameter section 32 adjacent lateral bores 21, 22 and thus forces locking elements 25 into an extreme projected position as shown in FIG. 1 in the drawings. An assembly screw 36 mounted within the uppermost threaded portion of the bore 20 provides an internal stop which defines the extent of travel of actuating rod 30 within bore 20. Normally spring 34 would biase rod 30 to the position of FIG. 1. Spring 34 would be held in place by cap screw 36. Cap screw 36 is mounted within the threaded portion of bore 20 in an adjustable fashion to increase or decrease the biase of spring 34 by compressing or releasing it as desired. Interchangeable ball 40 is an integral preferably one piece construction having an internal bore 42 and an annular shoulder 44 which abuts against flange 14 of bumper pin 12. An internal bore 42 of ball 40 is a closed end bore terminating at transverse face 43 which normally abuts against and registers with the uppermost surface 13 of bumper pin 12.

Internal bore 42 also provides an annular groove 46 receptive of locking elements 25. Annular groove 46 would be a 360° groove so that trailer ball 40 would connect with bumper pin 12 no matter what annular position ball 40 and elements 25 assume with respect to each other upon assembly.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An interchangeable trailer ball apparatus comprising:
   a. an elongated bumper pin having an internal longitudinal bore, and at least one lateral bore intersecting the longitudinal bore;
   b. attachment means for removably affixing the bumper pin to a vehicle bumper;
   c. at least one locking element movably mounted in the lateral bore between retracted and projected positions;
   d. an operable actuating rod movably mounted in the bumper pin longitudinal bore so that longitudinal movement of the rod within the longitudinal bore between respective upper and lower positions can effect movement of the locking element respectively between the retracted and projected positions;
   e. a trailer ball having an opening at its lower end that is receptive of the bumper pin;
   f. recess means on the trailer ball and communicating with the trailer ball elongated opening for forming a connection with the locking element when the locking element is in the projected position so that the trailer ball can be secured to the bumper pin.

2. The interchangeable trailer ball apparatus of claim 1 wherein there are a pair of locking elements and a pair of lateral bores placed generally opposite one another.

3. The interchangeable trailer ball apparatus of claim 1 wherein the actuating rod is a variable diameter rod having an enlarged portion which is disposed adjacent the lateral bores when the locking elements assume the projected positions.

4. The apparatus of claim 3 wherein the locking elements are held in the projected position by the enlarged diameter portion of the actuating rod.

5. The interchangeable trailer ball apparatus of claim 1 wherein there is further provided biasing means for biasing the actuating rod into the projected position which places the enlarged portion thereof adjacent the locking elements.

6. The interchangeable trailer ball apparatus of claim 1 wherein the trailer ball is an integral one piece trailer ball having an annular bore which is closed at one end, the open end thereof being receptive of the bumper pin.

7. The interchangeable trailer ball apparatus of claim 1 wherein the recess means is an annular groove formed in the trailer ball elongated opening and positioned to cooperatively connect with the locking elements of the bumper pin.

8. The interchangeable trailer ball apparatus of claim 7, wherein the trailer ball includes an upper rounded ball and extends to a lower annular shoulder, the combination of which covers that portion of the bumper pin which extends above the vehicle bumper to which the bumper pin is affixed during operation.

9. An interchangeable trailer ball apparatus comprising:
 a. an elongated bumper pin having an internal longitudinal bore and at least one lateral bore which intersects the longitudinal bore;
 b. attachment means for removably affixing the bumper pin to a vehicle bumper;
 c. at least one locking element movably mounted within the lateral bore between retracted and projected positions;
 d. an operable actuating rod movably mounted within the bumper pin longitudinal bore between upper and lower positions so that longitudinal movement of the rod within the longitudinal bore between the upper and lower positions can effect movement of the locking element respectively between the retracted and projected positions;
 e. an opening on the bumper pin and communicating with the internal longitudinal bore so that the actuating rod can be contacted through the opening and moved; and
 f. an integral trailer ball having a socket which is open at the lower end of the trailer ball and which is receptive of the bumper pin so that the trailer ball covers the bumper pin during operation.

10. The interchangeable trailer ball apparatus of claim 9, wherein the bumper pin is an elongated pin and the opening communicates with the bottom portion of the pin.

* * * * *